(12) United States Patent
Adomeit et al.

(10) Patent No.: US 6,402,237 B1
(45) Date of Patent: Jun. 11, 2002

(54) VEHICLE SEAT, ESPECIALLY AN AUTOMOBILE SEAT

(75) Inventors: Heinz-Dieter Adomeit; Sami Al Samarae, both of Berlin (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 09/600,539

(22) PCT Filed: Jan. 21, 1999

(86) PCT No.: PCT/DE99/00202

§ 371 (c)(1),
(2), (4) Date: Jul. 18, 2000

(87) PCT Pub. No.: WO99/37500

PCT Pub. Date: Jul. 29, 1999

(30) Foreign Application Priority Data

Jan. 22, 1998 (DE) .......................... 198 03 784

(51) Int. Cl.⁷ .................................. B60N 2/42
(52) U.S. Cl. ..................................... 297/216.1
(58) Field of Search ........................ 297/216.1, 284.1, 297/487, 464

(56) References Cited

U.S. PATENT DOCUMENTS

| | | | |
|---|---|---|---|
| 4,154,472 A | 5/1979 | Bryll | 296/65 |
| 4,711,497 A | 12/1987 | Kazaoka et al. | 297/458 |
| 5,462,339 A | 10/1995 | Schmale et al. | 297/452.55 |
| 5,558,399 A | * 9/1996 | Serber | 297/216.1 X |
| 5,567,006 A | * 10/1996 | McCarthy | 297/216.1 X |

FOREIGN PATENT DOCUMENTS

| | | | |
|---|---|---|---|
| DE | 35 21 067 | 12/1985 | |
| DE | 41 28 954 | 6/1993 | |
| DE | 42 11 964 | 10/1993 | |
| DE | 196 00 551 | 8/1996 | |
| EP | 0 718 144 | 6/1996 | |
| FR | 2 754 498 | 4/1998 | |
| GB | 1 322 280 | 7/1973 | |
| GB | 1 348 873 | 3/1974 | |
| GB | 2 087 226 | 5/1982 | |
| JP | 401275230 | * 11/1989 | 297/216.1 |

* cited by examiner

Primary Examiner—Jerry Redman
(74) Attorney, Agent, or Firm—Foley & Lardner

(57) ABSTRACT

A vehicle seat for an automobile has a shell with a transverse slot and at least one energy absorbing support located in the slot, in the front part of the seat. The support is horizontally deformable by the pelvis of the occupant when the latter is displaced forward as a result of a sharp deceleration of the vehicle. The portion of the shell behind the support is deformable downwardly at least partially by the pelvis of the occupant when he or she is displaced forward as a result of a sharp deceleration of the vehicle. The height of the support remains substantially unchanged as a result.

10 Claims, 2 Drawing Sheets

VEHICLE SEAT, ESPECIALLY AN AUTOMOBILE SEAT

BACKGROUND OF THE INVENTION

The invention relates to a vehicle seat, in particular a motor vehicle seat.

It is known to upholster vehicle seats in such a manner that they are capable at least of reducing accelerations exerted on the occupants during shaking of the vehicle, for example as a consequence of road bumpiness in the case of motor vehicles or as a consequence of the pounding of waves in the case of boats.

Furthermore, EP 0 718 144 A1 discloses a seat for a motorbike, in which additional energy absorption elements are arranged in the seat cushion, i.e. in the comfort region, of motorbike seats. These elements preferably consist of soft polyurethane foam, are arranged in different shapes in the seat cushion and extend over a certain length in the seat in the direction of the longitudinal axis of the vehicle. In one embodiment, they have a greater thickness at their front edge than at the rear edge, the thickness continuously decreasing and their upper side sloping down obliquely rearward. This is intended to avoid to an increased extent the driver's pelvis being displaced forward due to vibrations and during decelerations of the vehicle.

With these energy absorption elements, vibrations and accelerations of the pelvis during decelerations of the vehicle, as occur during braking, may possibly be reduced. In practice, situations occur in which energy absorption elements do not sufficiently reduce the accelerations of the pelvis forward, particularly when used in a car, if pronounced decelerations of the vehicle occur, as in the event of a crash. During these decelerations the lower shell of the vehicle seat is subjected to vertical and horizontal forces only in a subsequent forward displacement phase of the pelvis. In this case, the level of force is too low for energy absorption. Therefore, in these cases, when an occupant has his seat belt on in a motor vehicle, the kinetic energy of the occupant is predominantly dissipated via the belt system. Because of the force-path characteristic of the belt band, this can lead to unnecessarily increased loads on the pelvis and to severe loads on the lumbar spinal column because of uncontrolled rotation of the pelvis.

GB-A 2,087,226 discloses a vehicle seat in a shell structure whose shell is composed of a rear and a front flat shell element consisting in each case of metal. The rear shell element is essentially of planar design and fastened to the seat structure below the backrest. The front shell element, which is connected to the rear shell element, extends from the front end of the backrest as far as the front end of the seat cushion and is curved upwards at this point. The upwardly curved, front section of the front shell element serves to absorb crash forces if a person on the seat is accelerated forward as a consequence of a crash. By means of the restraining forces exerted by the upwardly curved section of the front shell element, the intention is in particular to prevent the occupant from lifting off forward from the seat.

SUMMARY OF THE INVENTION

The invention is based on the object of reducing the loads on the occupants in the event of great deceleration of the vehicle, in particular as a consequence of a crash, by means of an early increase in the restraining forces and an increase in the energy absorption capability of the seat system.

According to the invention, this is achieved in the case of a vehicle seat having at least one energy absorption element. A support is arranged as a separate component of the energy absorption element, where the support is arranged in the front part of the seat below the comfort region and is deformable in the horizontal direction by the pelvis of the occupant when the occupant is displaced forward as a consequence of a sharp deceleration of the vehicle as in a crash. The seat structure can be deformed downward in the rear region of the seat particularly in the vicinity of the support, at least partially due to the forward displacement of the occupant's pelvis upon sharp deceleration of the vehicle. The force flux between the support and the deformable seat structure is completely or partially uncoupled, so that the vertical position of the support remains virtually unchanged.

The advantage of this arrangement resides in the fact that in the event of a crash a positive engagement is produced between the pelvis-ischium protuberances of the occupant, on the one hand, and the seat structure and support, on the other hand, so that the restraining forces acting on the occupant are applied by the seat to an increased extent. In the case of a large deceleration of the vehicle, during the horizontal forward displacement, the pelvis, because of the lap belt, also makes a vertical penetrating movement into the deformable seat structure which is arranged in front of the support, as seen in the direction of travel. Since the support is provided with high stiffness vertically, and the force flux between the support and deformable seat structure is entirely or partially decoupled in a suitable manner, deformation of the support in this direction is virtually eliminated. A shoulder is formed which prevents the occupant from sliding off. During further forward displacement of the pelvis, the support is deformed in the horizontal direction and subjects the pelvis to reasonable restraining forces. The pelvis is braked horizontally in the acceleration direction of the occupant to an extent as in a safety strap. Loads on the occupant are reduced by this targeted subjecting of the pelvis to restraining forces.

The seat system components are configured in such a manner that the positive engagement is only produced in the event of a crash, i.e. for comfort reasons cannot be felt during normal driving.

In one embodiment, the support extends over the entire seat width and is connected at the ends to the seat structure, while there is no connection to the seat structure in the remaining region. This ensures the deformation, necessary for forming the shoulder, of that region of the seat structure lying behind or in rear of the support.

In the case of a seat structure in the form of a shell, the shell has a slot which runs transversely to the longitudinal axis of the vehicle and in which the support is arranged. The width of the slot is dimensioned in such a manner that the deformability of the support in the horizontal direction is also ensured in the case of a seat structure in the form of a shell.

A further embodiment likewise has a seat structure in the form of a shell, there being a connection in this case over the entire seat width between the support and that region of the seat structure lying behind or in rear of it. The seat structure deformation desired in the event of a crash is ensured here by a fold in the sheet metal provided in rear of the support.

In a third embodiment, the deformability of the seat structure is ensured by the formation of that region lying behind or in rear of the support, as interwoven material. In this case, the connection between the support and the seat structure is expediently interrupted in the central region.

During the forward displacement, the pelvis, because of the belt geometry, executes a vertical penetrating movement into the seat, the rear region of the seat being deformed vertically. In order to maintain the shoulder produced as a result in rear of the support, it is expedient for the support in the vertical direction to be of great stiffness in order to prevent the occupant from sliding over the shoulder.

In one embodiment, the support consists of a tube having a web attached in the vertical direction in order to increase the stiffness. As a further design for a support, any profiled form is conceivable which counters a deformation in the vertical direction with sufficiently great resistance and, by means of the option of a horizontal deformation, subjects the occupant to acceptable restraining forces.

DESCRIPTION OF THE DRAWINGS

The invention will be explained in exemplary embodiments with reference to drawings, in which.

DETAILED DESCRIPTION OF THE INVENTION

Figure 1:
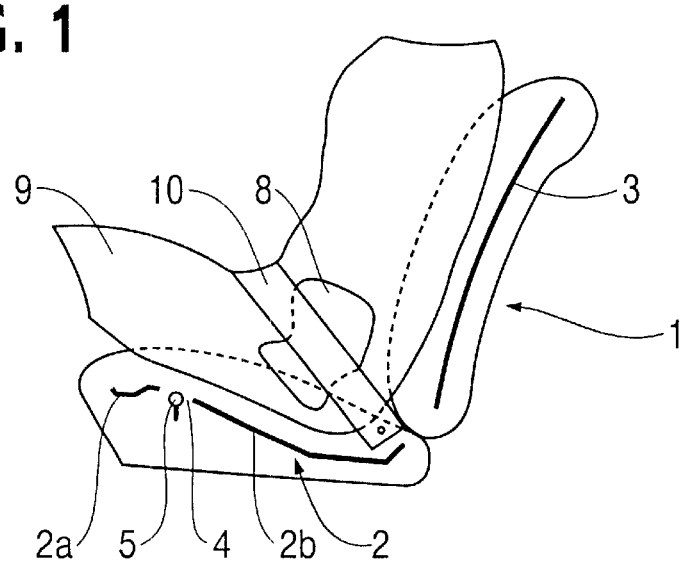
FIG. 1 shows a schematic illustration of an embodiment of a vehicle seat with a slot running transversely in front of a support.
Figure 6:
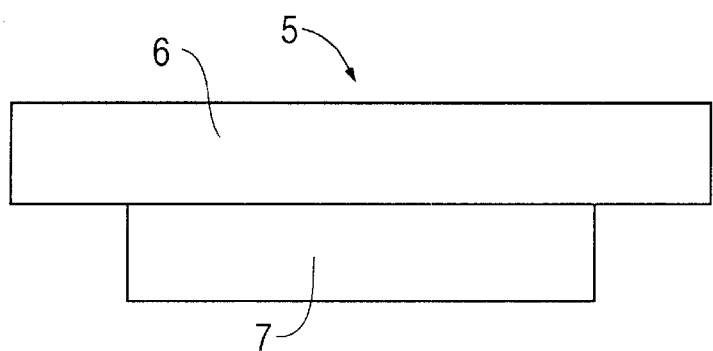
FIG. 6 shows the front view of a support designed as an energy absorption element.
Figure 7:
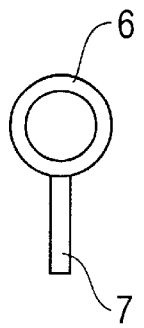
FIG. 7 shows the side view of the support according to FIG. 6.

The vehicle seat 1 illustrated schematically in FIG. 1 has a seat shell 2 and a backrest 3. In the front region, the seat shell 2 has a slot 4 which extends at least virtually over the entire width of the seat shell. The seat shell 2 is divided by the slot 4 into a front region 2a and a rear region 2b. A support 5 is arranged in this slot as an energy absorption element which consists of a tube 6 and a web 7 which extends over the central region of the tube and in the vertical direction (FIGS. 6 and 7).

The support is only connected at its ends to the seat structure. In the horizontal direction, the support is provided with a stiffness which permits deformation by the occupant after positive engagement is produced. In the vertical direction, in contrast, it has a high degree of stiffness, so that deformation in this direction is virtually impossible or is suppressed. The tube 6 is arranged in the slot in such a manner that it ends at the top at the seat shell, i.e. does not protrude out of the latter. The support does not therefore penetrate into the upholstery during normal driving and cannot therefore be felt by the occupant.

FIG. 1 likewise shows schematically the pelvis 8 of the occupant and the lap belt 10.

Figure 2:
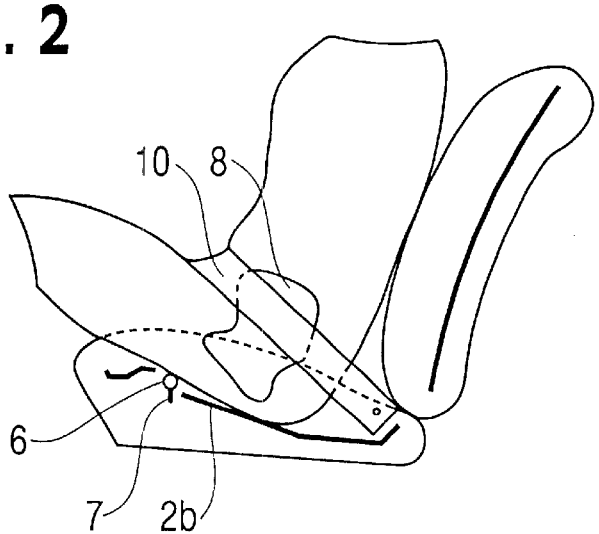
FIG. 2 shows the vehicle seat according to FIG. 1 during the deceleration phase of the vehicle.
Figure 3:
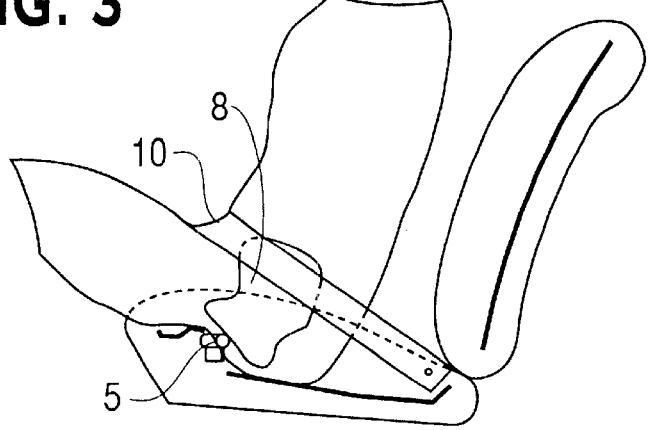
FIG. 3 shows the vehicle seat according to FIG. 1 in an advanced deceleration phase of the vehicle.

During a pronounced deceleration of the vehicle, for example as a consequence of a crash, the pelvis endeavors to be displaced forward. Because of the lap belt 10, during the horizontal forward displacement, the pelvis also executes a vertical penetrating movement into the seat. The novel design of the seat means that the pelvis thereby deforms the rear region 2b of the seat shell 2, i.e., the region lying behind or in rear of the support 5, downwardly, as is illustrated in FIG. 2. The seat shell can be particularly easily deformed at the slot 4, so that the support 5, whose height does not change, protrudes over the seat shell. As a result, a positive engagement between the pelvis-ischium protuberances and the support is obtained, and finally a type of hooked connection between the two occurs. The reinforcement of the tube 6 by the web 7 prevents the deformation of the support in the vertical direction and therefore prevents the pelvis 8 from sliding over the tube 6. In contrast, the support is deformed in a targeted manner in the horizontal direction, the pelvis being restrained with appropriate force. The pelvis is braked horizontally in the acceleration direction to an extent as in a safety strap, as can be seen from FIG. 3. As a result, in the case of a crash the kinetic energy of the occupant 9 is dissipated both by the lap belt 10 and by the support 5, so that the load on the occupant is reduced.

Figure 4:
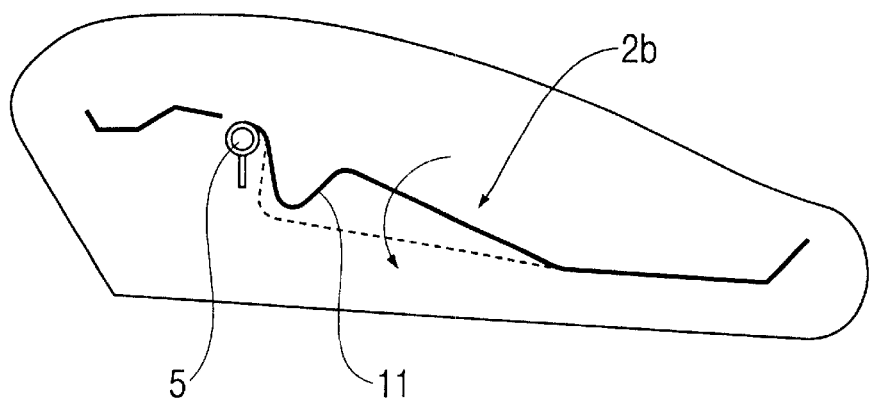
FIG. 4 shows a schematic illustration of a second embodiment of a vehicle seat with a fold running transversely in front of the support in a seat shell.

In the exemplary embodiment of FIG. 4, the seat shell 2 has a fold 11 behind the support 5. In this exemplary embodiment, the seat shell is connected to the support 5. In the event of a crash, the region 2b is pressed downwardly by the occupant, so that the seat shell then has the profile indicated by dashed lines. In conjunction with the support 5, the same effect as in the preceding exemplary embodiment is obtained.

Figure 5:
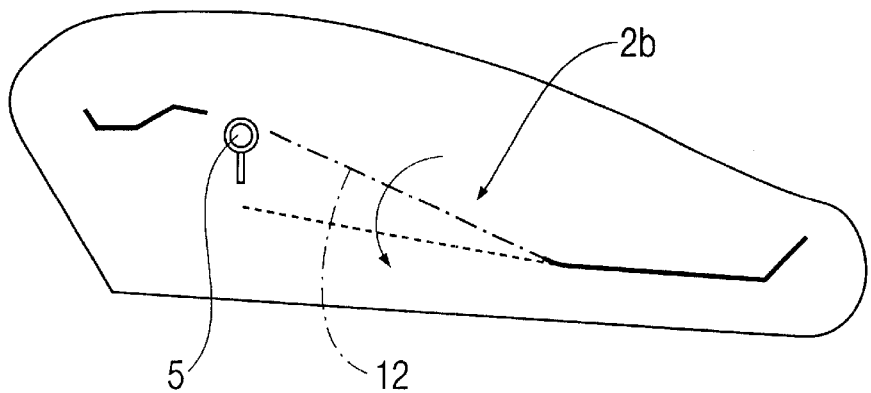
FIG. 5 shows a schematic illustration of a third embodiment of a vehicle seat with interwoven material in front of the support.

In the exemplary embodiment of FIG. 5, that region 2b of the seat lying behind or in rear of the support 5 consists of interwoven material 12. This is not connected to the support 5 in the central region. In the event of a crash, the interwoven material is deformed downward and assumes the position indicated in FIG. 5 by dashed lines. The support is thereby effective in the same manner as in the case of the preceding exemplary embodiments.

What is claimed is:

1. A vehicle seat for an occupant of a vehicle, comprising:
   a front part, a rear region, and a comfort region,
   an energy absorption element including a support arranged as a separate component, the support being arranged in the front part of the seat below the comfort region and being deformable in a horizontal direction by the pelvis of the occupant when the pelvis is displaced forward by a sharp deceleration of the vehicle, and
   a seat structure that is deformable downwardly in the rear region of the seat in the vicinity of the support, at least partially due to the pelvis of the occupant when the pelvis is displaced forward by a sharp deceleration of the vehicle,
   wherein forces exerted between the support and the deformable seat structure are at least partially uncoupled, so that the vertical position of the support remains virtually unchanged.

2. The vehicle seat according to claim 1, wherein the support has ends and extends over the entire seat width, the support being connected at the ends to the seat structure but having no connection to the seat structure in the remaining region of the support.

3. The vehicle seat according to claim 1, wherein the support has ends and extends over the entire seat width, the support being connected at the ends to the seat structure and being at least partially connected to the seat structure in the remaining region.

4. The vehicle seat according to claim 1 or 2, wherein the seat structure has the form of a shell, and the shell has a slot that runs transversely to the longitudinal axis of the vehicle and within which the support is arranged.

5. The vehicle seat according to claim 1, wherein the support has a sufficient stiffness in the vertical direction so that the support is substantially undeformable in the vertical direction.

6. The vehicle seat according to claim 1, wherein the support consists of a tube having a vertical web.

7. The vehicle seat of claim 1, wherein the vehicle is a motor vehicle.

8. The vehicle seat of claim 1, wherein the support and the deformable seat structure are completely uncoupled.

9. A vehicle seat for an occupant of a vehicle, comprising:

a front part, a rear region, and a comfort region, an energy absorption element including a support arranged as a separate component, the support being arranged in the front part of the seat below the comfort region and being deformable in a horizontal direction by the pelvis of the occupant when the pelvis is displaced forward by a sharp deceleration of the vehicle, and a seat structure that is deformable downwardly in the rear region of the seat in the vicinity of the support, at least partially due to the pelvis of the occupant when the pelvis is displaced forward by a sharp deceleration of the vehicle, wherein forces exerted between the support and the deformable seat structure are at least partially uncoupled, so that the vertical position of the support remains virtually unchanged, and wherein the rear region of the seat structure is formed as interwoven material in front of which the support is arranged.

10. A vehicle seat for an occupant of a vehicle, comprising:

a front part, a rear region, and a comfort region, an energy absorption element including a support arranged as a separate component, the support being arranged in the front part of the seat below the comfort region and being deformable in a horizontal direction by the pelvis of the occupant when the pelvis is displaced forward by a sharp deceleration of the vehicle, and a seat structure that is deformable downwardly in the rear region of the seat in the vicinity of the support, at least partially due to the pelvis of the occupant when the pelvis is displaced forward by a sharp deceleration of the vehicle, wherein forces exerted between the support and the deformable seat structure are at least partially uncoupled, so that the vertical position of the support remains virtually unchanged, and wherein the seat structure has the form of a shell, and the shell has at least one fold that runs transversely to the longitudinal axis of the vehicle, wherein the support is arranged in front of the fold.

* * * * *